(12) United States Patent
Dandan

(10) Patent No.: US 10,925,277 B2
(45) Date of Patent: Feb. 23, 2021

(54) WILDLIFE EXCLUSION SYSTEM AND METHOD

(71) Applicant: DOMINION ENERGY, INC., Richmond, VA (US)

(72) Inventor: Riad Nabih Dandan, Glen Allen, VA (US)

(73) Assignee: Dominion Energy, Inc., Richmond, VA (US)

( * ) Notice: Subject to any disclaimer, the term of this patent is extended or adjusted under 35 U.S.C. 154(b) by 33 days.

(21) Appl. No.: 16/585,990

(22) Filed: Sep. 27, 2019

(65) Prior Publication Data

US 2020/0100492 A1    Apr. 2, 2020

Related U.S. Application Data

(60) Provisional application No. 62/740,246, filed on Oct. 2, 2018.

(51) Int. Cl.
*A01M 29/32* (2011.01)
*A01M 1/24* (2006.01)
*A01M 29/30* (2011.01)

(52) U.S. Cl.
CPC .............. *A01M 29/32* (2013.01); *A01M 1/24* (2013.01); *A01M 29/30* (2013.01); *F25B 2339/04* (2013.01); *F25B 2600/111* (2013.01)

(58) Field of Classification Search
CPC ........ A01M 1/24; A01M 23/00; A01M 29/00; A01M 29/30; A01M 29/32; F25B 2339/04; F25B 2600/111
See application file for complete search history.

(56) References Cited

U.S. PATENT DOCUMENTS

| 5,083,396 A | * | 1/1992 | Traut | A01G 13/10 |
| | | | | 47/22.1 |
| 5,451,445 A | * | 9/1995 | Wang | A01G 13/0206 |
| | | | | 160/84.01 |
| 6,082,285 A | * | 7/2000 | Hinrichs | B63B 17/02 |
| | | | | 114/343 |
| 10,004,220 B2 | * | 6/2018 | Donohue | A01M 29/32 |
| 10,321,673 B1 | * | 6/2019 | Bagley | A01M 29/32 |
| 2004/0083643 A1 | * | 5/2004 | Wu | A01M 29/32 |
| | | | | 43/134 |

(Continued)

*Primary Examiner* — Jessie T Fonseca
(74) *Attorney, Agent, or Firm* — Patent Law of Virginia, PLLC; Brian J. Teague

(57) ABSTRACT

A system for limiting access by flying animals to fans of an air-cooled condenser comprises a plurality of perimeter netting segments and interior netting segments. The fans are mounted on a framework and arranged in a matrix. Each fan comprises either (i) a perimeter fan positioned along any one of three or four outer edges of the matrix or (ii) an interior fan. Each perimeter netting segment is adapted to be positioned at least partly below a corresponding one of the perimeter fans. Each interior netting segment is adapted to be positioned at least partly below a corresponding one of the interior fans. Each perimeter netting segment has a first edge adapted to be affixed to the framework and a second edge affixed to a corresponding interior netting segment. At least a portion of each perimeter netting segment is angled inward and downward toward its corresponding interior netting segment.

26 Claims, 10 Drawing Sheets

(56) References Cited

U.S. PATENT DOCUMENTS

2006/0277837 A1* 12/2006 Wilsey .................. E04C 5/07
                                                     52/79.1
2007/0074448 A1*  4/2007 Igarashi ............... A01M 29/12
                                                     43/131
2012/0186165 A1*  7/2012 Wilsey .................. E04C 5/07
                                                     52/63
2016/0255829 A1*  9/2016 Reger .................. A01M 29/32

* cited by examiner

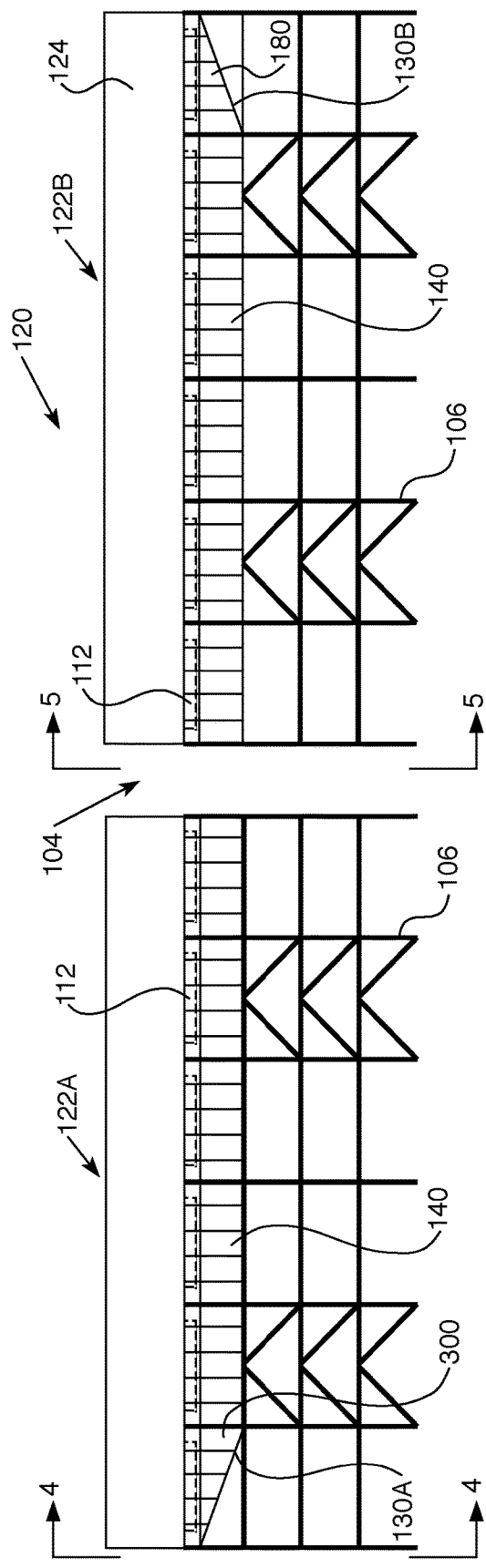
FIG. 3
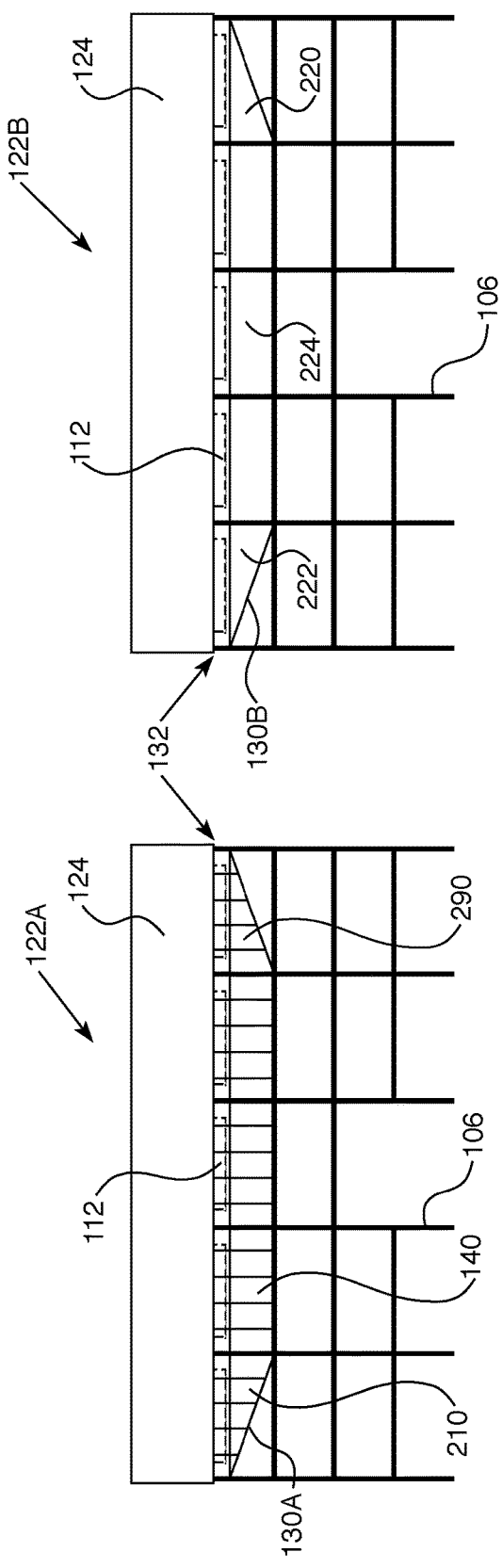
FIG. 5
FIG. 4

WILDLIFE EXCLUSION SYSTEM AND METHOD

CROSS-REFERENCE TO RELATED APPLICATIONS

This application claims priority to pending U.S. Provisional Application Ser. No. 62/740,246, filed Oct. 2, 2018, the contents of which are incorporated herein by reference in their entirety.

FIELD OF THE INVENTION

The present invention relates generally to netting structures for excluding flying animals.

BACKGROUND OF THE DISCLOSURE

Many types of power generation plants heat water into steam. The steam is used to spin a turbine, which in turn spins a generator to produce electricity. After leaving the turbine, the steam needs to be cooled and condensed.

One method of cooling and condensing the steam is to use an air-cooled condenser (ACC). As seen in FIG. 1, an ACC 100 often comprises two adjacent sub-units 102A, 102B. A space 104 between the two sub-units 102A, 102B houses the steam header (not illustrated) that distributes steam to be condensed to the two sub-units 102A, 102B. Each of the two sub-units 102A, 102B comprises a large structural framework 106. The framework 106 comprises a carefully engineering assembly of structural components (vertical posts, horizontal and angled beams, etc.) to support the steam condensing equipment. (The illustrated framework is greatly simplified for clarity, with many conventional structural details omitted.) In one exemplary embodiment, the framework is about 100 feet high, over 200 feet long, and almost 200 feet wide, but can be smaller or much larger. Supported at the top of each framework is a plurality of pipes 108 and heat exchangers 110 that receive and distribute the steam to be condensed. The pipes and heat exchangers are typically surrounded by a peripheral wall (the wall is omitted from FIG. 1 for clarity, but such a peripheral wall 124 is shown in FIGS. 3-5). A plurality of selectively rotating fans 112 are mounted on each framework 106. The fans 112 are very large, in one exemplary embodiment having a diameter of about 36 feet. Each fan 112 is positioned at a same vertical position on the framework 106. Each fan 112 is positioned to selectively intake air from below the fan 112 and eject air upward across a portion of the pipes 108 and heat exchangers 110. The air from the fan flowing across the heat exchangers 110 cools the steam so that the steam condenses.

The air drawn into the fans 112 can have a fairly high speed, especially close to the fan (e.g., often about 20 miles per hour right next to the fan). This high speed air can undesirably draw in and kill birds, bats, etc. that fly too close to the intake side of the fans. These fans create air current in the vicinity of the ACC which bats particularly follow.

BRIEF SUMMARY OF THE DISCLOSURE

In one embodiment of the invention, a system for limiting access by flying animals to a plurality of selectively rotating fans of an air-cooled condenser comprises a plurality of netting segments comprising a plurality of perimeter netting segments and a plurality of interior netting segments. The fans are mounted on a framework and arranged in a matrix. Each fan is positioned at a same vertical position on the framework. Each fan is positioned to selectively intake air from below the fan and eject air above the fan, forcing the air across a large portion of the heat exchanger (radiators). Each fan comprises either (i) a perimeter fan positioned along any one of three or four outer edges of the matrix or (ii) an interior fan. Each perimeter netting segment is adapted to be positioned at least partly below a corresponding one of the perimeter fans. Each interior netting segment is adapted to be positioned at least partly below a corresponding one of the interior fans. Each perimeter netting segment has a first edge adapted to be affixed to the framework and a second edge affixed to a corresponding interior netting segment. At least a portion of each perimeter netting segment is angled inward and downward toward its corresponding interior netting segment.

Each interior netting segment may be adapted to be positioned substantially parallel to its corresponding interior fan.

The plurality of netting segments may further comprise two or more corner netting segment pairs. Each corner netting segment pair may be adapted to be positioned at least partly below a corresponding corner perimeter fan. Each corner netting segment pair may comprise adjacent first and second corner netting segments. Each of the first and second corner netting segments may have a first edge adapted to be affixed to the framework, a second edge affixed to a corresponding perimeter netting segment, and a third edge affixed to the other corner netting segment.

The plurality of netting segments may further comprise two or more corner netting segments. Each corner netting segment may be adapted to be positioned at least partly below a corresponding corner perimeter fan. Each corner netting segment may have a first edge adapted to be affixed to the framework, a second edge affixed to a first corresponding perimeter netting segment, and a third edge affixed to a second corresponding perimeter netting segment.

The plurality of netting segments may further comprise one or more vertical netting segments. Each vertical netting segment may have a first edge adapted to be affixed to the framework and a second edge affixed to a corresponding interior netting segment. The plurality of netting segments may further comprise one or more vertical corner netting segments. Each vertical corner netting segment may have a first edge adapted to be affixed to the framework, a second edge affixed to a corresponding vertical netting segment, and a third edge affixed to a corresponding perimeter netting segment.

Each interior netting segment may be adapted to be spaced apart from its corresponding interior fan at a distance selected such that the intake air at a level of the interior netting segment has a speed slow enough such that a predetermined species of flying animal that is flying below the interior netting segment will not be drawn into the interior netting segment.

Each interior netting segment may be adapted to be spaced apart from its corresponding interior fan at a distance selected such that the intake air at a level of the interior netting segment has a speed less than twenty percent of a maximum speed of a predetermined species of flying animal.

One or more of the perimeter netting segments may comprise a plurality of pairs of flexible straps. At least corresponding first sections of each pair of straps may sandwich a portion of the respective perimeter netting segment and may be affixed to each other. Corresponding second sections of one or more of the pairs of flexible straps may be affixed to each other without sandwiching a portion of the respective perimeter netting segment. The second sections of one or more of the pairs of flexible straps of one or more of the perimeter netting segments may be adapted to be affixed to a portion of the framework.

One or more of the interior netting segments may comprise a plurality of pairs of flexible straps that sandwich a portion of the respective interior netting segment and are affixed to each other.

The second edge of each perimeter netting segment may be affixed to the corresponding interior netting segment via an elongated bar sandwiching portions of the perimeter netting segment and the corresponding interior netting segment against a portion of the framework.

Each interior netting segment may comprise at least one edge that is affixed to a corresponding edge of an adjacent interior netting segment. The at least one edge of each interior netting segment may be affixed to the corresponding edge of the adjacent interior netting segment via an elongated bar sandwiching corresponding portions of the adjacent interior netting segments against a portion of the framework.

An alternative embodiment of the invention includes a method for limiting access by flying animals to a plurality of selectively rotating fans of an air-cooled condenser. The fans are mounted on a framework and arranged in a matrix. Each fan is positioned at a same vertical position on the framework. Each fan is positioned to selectively intake air from below the fan and eject air above the fan. Each fan comprises either (i) a perimeter fan positioned along any one of three or four outer edges of the matrix or (ii) an interior fan. The method comprises (a) positioning each of a plurality of perimeter netting segments at least partly below a corresponding one of the perimeter fans, each perimeter netting segment having a first edge and a second edge; (b) positioning each of a plurality of interior netting segments at least partly below a corresponding one of the interior fans; (c) affixing the first edge of each perimeter netting segment to the framework; and (d) affixing the second edge of each perimeter netting segment to a corresponding interior netting segment. At least a portion of each perimeter netting segment is angled inward and downward toward its corresponding interior netting segment.

Each interior netting segment may be positioned substantially parallel to its corresponding interior fan.

The method may further comprise (i) positioning each of two or more corner netting segment pairs at least partly below a corresponding corner perimeter fan, each corner netting segment pair comprising adjacent first and second corner netting segments, each of the first and second corner netting segments having a first edge, a second edge, and a third edge; (ii) affixing the first edge of each of the first and second corner netting segments to the framework; (iii) affixing the second edge of each of the first and second corner netting segments to a corresponding perimeter netting segment; and (iv) affixing the third edge of each of the first and second corner netting segments to the other corner netting segment.

The method may further comprise (i) positioning each of two or more corner netting segments at least partly below a corresponding corner perimeter fan, each corner netting segment having a first edge, a second edge, and a third edge; (ii) affixing the first edge of each corner netting segment to the framework; (iii) affixing the second edge of each corner netting segment to a first corresponding perimeter netting segment; and (iv) affixing the third edge of each corner netting segment to a second corresponding perimeter netting segment.

The method may further comprise (i) affixing a first edge of each of one or more vertical netting segments to the framework; and (ii) affixing a second edge of each of the one or more vertical netting segments to a corresponding interior netting segment.

The method may further comprise (i) affixing a first edge of each of one or more vertical corner netting segments to the framework; (ii) affixing a second edge of each of the one or more vertical corner netting segments to a corresponding vertical netting segment; and (iii) affixing a third edge of each of one or more vertical corner netting segments to a corresponding perimeter netting segment.

Each interior netting segment may be spaced apart from its corresponding interior fan at a distance selected such that the intake air at a level of the interior netting segment has a speed slow enough such that a predetermined species of flying animal that is flying below the interior netting segment will not be drawn into the interior netting segment.

Each interior netting segment may be spaced apart from its corresponding interior fan at a distance selected such that the intake air at a level of the interior netting segment has a speed less than twenty percent of a maximum speed of a predetermined species of flying animal.

One or more of the perimeter netting segments may comprise a plurality of pairs of flexible straps. At least corresponding first sections of each pair of straps may sandwich a portion of the respective perimeter netting segment and may be affixed to each other. Corresponding second sections of one or more of the pairs of flexible straps may be affixed to each other without sandwiching a portion of the respective perimeter netting segment. The method may further comprise affixing the second sections of one or more of the pairs of flexible straps of one or more of the perimeter netting segments to a portion of the framework.

One or more of the interior netting segments may comprise a plurality of pairs of flexible strap that sandwich a portion of the respective interior netting segment and are affixed to each other.

The second edge of each perimeter netting segment may be affixed to the corresponding interior netting segment via an elongated bar sandwiching portions of the perimeter netting segment and the corresponding interior netting segment against a portion of the framework.

The method may further comprise affixing at least one edge of each interior netting segment to a corresponding edge of an adjacent interior netting segment. The least one edge of each interior netting segment may be affixed to the corresponding edge of the adjacent interior netting segment via an elongated bar sandwiching corresponding portions of the adjacent interior netting segments against a portion of the framework.

Another alternative embodiment of the invention may comprise an air-cooled condenser system. The air-cooled condenser system comprises a framework, a plurality of pipes and radiators mounted on the framework for receiving steam to be condensed, a plurality of selectively rotating fans mounted on the framework and arranged in a matrix, and a plurality of netting segments. Each fan is positioned at a same vertical position on the framework. Each fan is positioned to selectively intake air from below the fan and eject air above the fan , forcing the air across a large portion of the heat exchanger (radiators). Each fan comprises either (i) a perimeter fan positioned along any one of three or four outer edges of the matrix or (ii) an interior fan. The plurality of netting segments comprises a plurality of perimeter netting segments and a plurality of interior netting segments. Each perimeter netting segment is positioned at least partly below a corresponding one of the perimeter fans. Each interior netting segment is positioned at least partly below a corresponding one of the interior fans. Each perimeter netting segment has a first edge affixed to the framework and a second edge affixed to a corresponding interior netting segment. At least a portion of each perimeter netting segment is angled inward and downward toward its corresponding interior netting segment.

Each interior netting segment may be positioned substantially parallel to its corresponding interior fan.

The plurality of netting segments may further comprise two or more corner netting segment pairs. Each corner netting segment pair may be positioned at least partly below a corresponding corner perimeter fan. Each corner netting segment pair may comprise adjacent first and second corner netting segments. Each of the first and second corner netting segments may have a first edge affixed to the framework, a second edge affixed to a corresponding perimeter netting segment, and a third edge affixed to the other corner netting segment.

The plurality of netting segments may further comprise two or more corner netting segments. Each corner netting segment may be positioned at least partly below a corresponding corner perimeter fan. Each corner netting segment may have a first edge affixed to the framework, a second edge affixed to a first corresponding perimeter netting segment, and a third edge affixed to a second corresponding perimeter netting segment.

The plurality of netting segments may further comprise one or more vertical netting segments, each vertical netting segment having a first edge affixed to the framework and a second edge affixed to a corresponding interior netting segment.

The plurality of netting segments may further comprise one or more vertical corner netting segments. Each vertical corner netting segment may have a first edge affixed to the framework, a second edge affixed to a corresponding vertical netting segment, and a third edge affixed to a corresponding perimeter netting segment.

Each interior netting segment may be spaced apart from its corresponding interior fan at a distance selected such that the intake air at a level of the interior netting segment has a speed slow enough such that a predetermined species of flying animal that is flying below the interior netting segment will not be drawn into the interior netting segment.

Each interior netting segment may be spaced apart from its corresponding interior fan at a distance selected such that the intake air at a level of the interior netting segment has a speed less than twenty percent of a maximum speed of a predetermined species of flying animal.

One or more of the perimeter netting segments may comprise a plurality of pairs of flexible straps. At least corresponding first sections of each pair of straps may sandwich a portion of the respective perimeter netting segment and may be affixed to each other. Corresponding second sections of one or more of the pairs of flexible straps may be affixed to each other without sandwiching a portion of the respective perimeter netting segment. The second sections of one or more of the pairs of flexible straps of one or more of the perimeter netting segments may be affixed to a portion of the framework.

One or more of the interior netting segments may comprise a plurality of pairs of flexible straps that sandwich a portion of the respective interior netting segment and are affixed to each other.

The second edge of each perimeter netting segment may be affixed to the corresponding interior netting segment via an elongated bar sandwiching portions of the perimeter netting segment and the corresponding interior netting segment against a portion of the framework.

Each interior netting segment may comprise at least one edge that is affixed to a corresponding edge of an adjacent interior netting segment. The at least one edge of each interior netting segment may be affixed to the corresponding edge of the adjacent interior netting segment via an elongated bar sandwiching corresponding portions of the adjacent interior netting segments against a portion of the framework.

BRIEF DESCRIPTION OF THE SEVERAL VIEWS OF THE DRAWINGS

The foregoing summary, as well as the following detailed description of the disclosure, will be better understood when read in conjunction with the appended drawings. For the purpose of illustrating the disclosure, there are shown in the drawings embodiments which are presently preferred. It should be understood, however, that the disclosure is not limited to the precise arrangements and instrumentalities shown. In the drawings:

FIG. 3 is a side view of an air-cooled condenser with a netting system installed in accordance with embodiments of the invention.

FIG. 4 is an exterior end view of the air-cooled condenser with a netting system installed of FIG. 3.

FIG. 5 is an interior end view of the air-cooled condenser with a netting system installed of FIG. 3.

DETAILED DESCRIPTION OF THE DISCLOSURE

Figure 1:
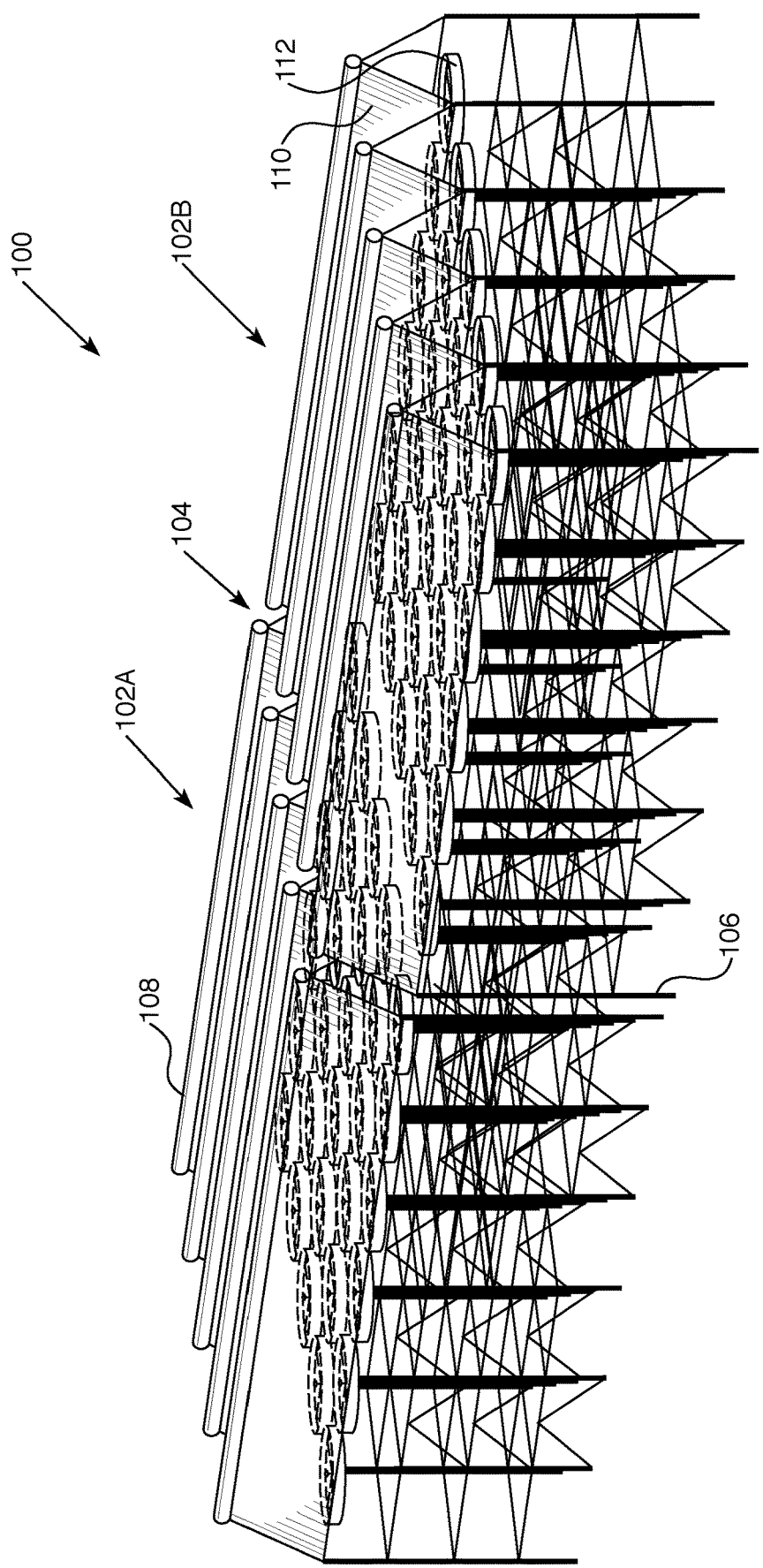
FIG. 1 is a perspective view of a conventional air-cooled condenser with which embodiments of the invention may be used.

Certain terminology is used in the following description for convenience only and is not limiting. The words "lower," "bottom," "upper," and "top" designate directions in the drawings to which reference is made. The words "inwardly," "outwardly," "upwardly" and "downwardly" refer to directions toward and away from, respectively, the geometric center of the device, and designated parts thereof, in accordance with the present disclosure. Unless specifically set forth herein, the terms "a," "an" and "the" are not limited to one element, but instead should be read as meaning "at least one." The terminology includes the words noted above, derivatives thereof and words of similar import.

Embodiments of the invention comprise a system for limiting access by flying animals (e.g., bats, birds, etc.) to a plurality of selectively rotating fans of an air-cooled condenser. The figures illustrate such a system on an ACC 120 that comprises two sub-units 122A, 122B with a steam header space 104 therebetween. Embodiments of the invention also comprise a method of limiting access by flying animals to a plurality of selectively rotating fans of an air-cooled condenser using such a netting system, and an ACC (such as ACC 120) having such a netting system installed.

Figure 2:
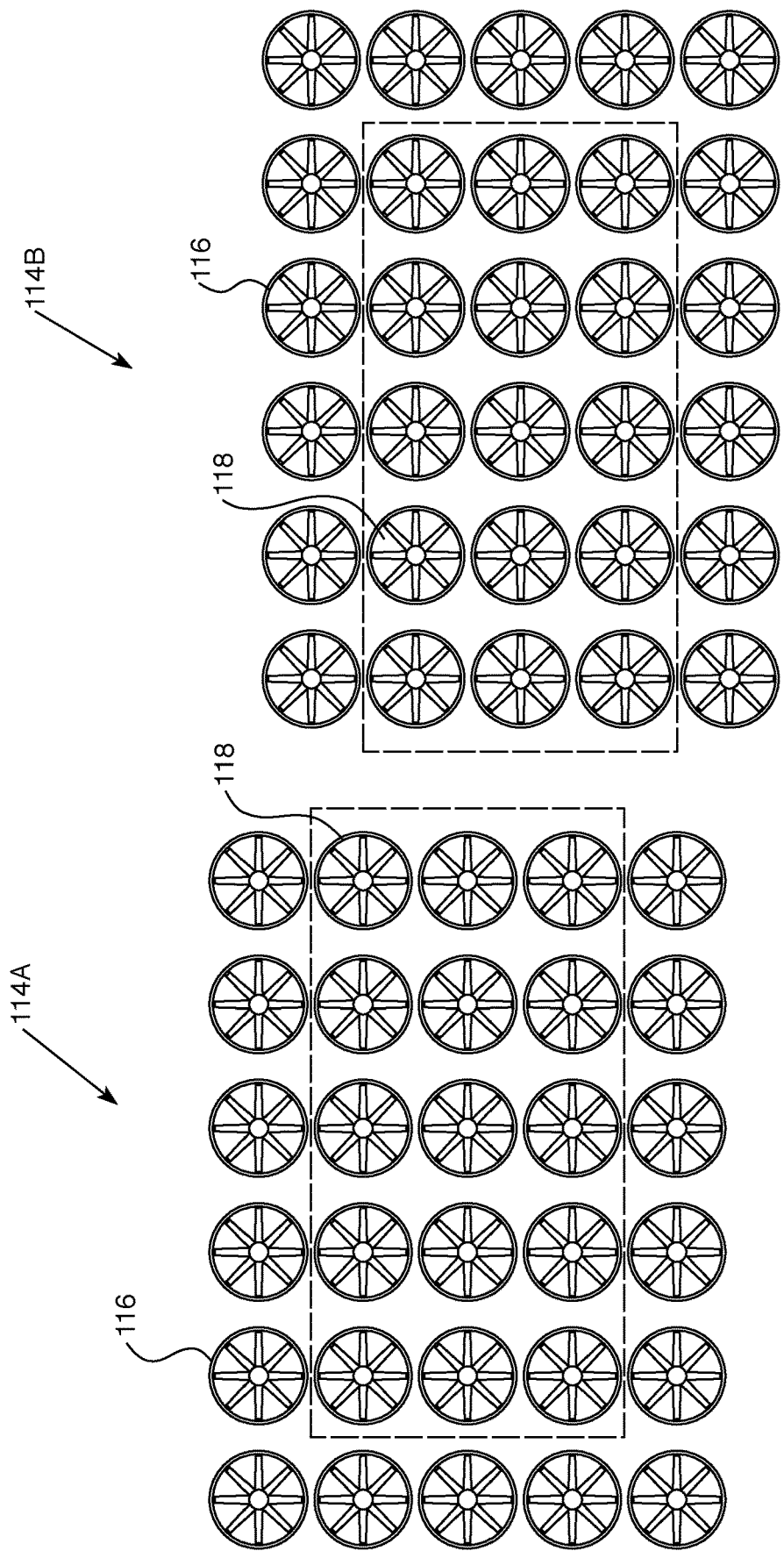
FIG. 2 is a top schematic view of the fans of an air-cooled condenser.

The fans 112 of an ACC (such as ACC 100 of FIG. 1 or ACC 120 of FIGS. 3-5) are arranged in a matrix, as best seen in FIG. 2. The matrix.114A of the first sub-unit 102A or 122A has thirty fans arranged in a 5x6 matrix. Similarly, the matrix.114B of the second sub-unit 102B or 122B has thirty fans arranged in a 5x6 matrix. Based on its location in the matrix, each fan may be termed either (i) a perimeter fan 116 that is positioned along any one of three outer edges of the matrix or (ii) an interior fan 118. The interior fans 118 are those within the dashed lines of FIG. 2, while the perimeter fans are those outside of the dashed lines. (The edges of the matrix adjacent the steam header space are typically considered inner edges rather than outer edges, thus each matrix is typically considered to have three outer edges. However, each matrix could be considered to have four outer edges in some circumstances, which would increase the number of perimeter fans and correspondingly decrease the number of interior fans.) The matrix may be considered to comprise a plurality of cells, with each fan being in a separate cell.

Figure 6:
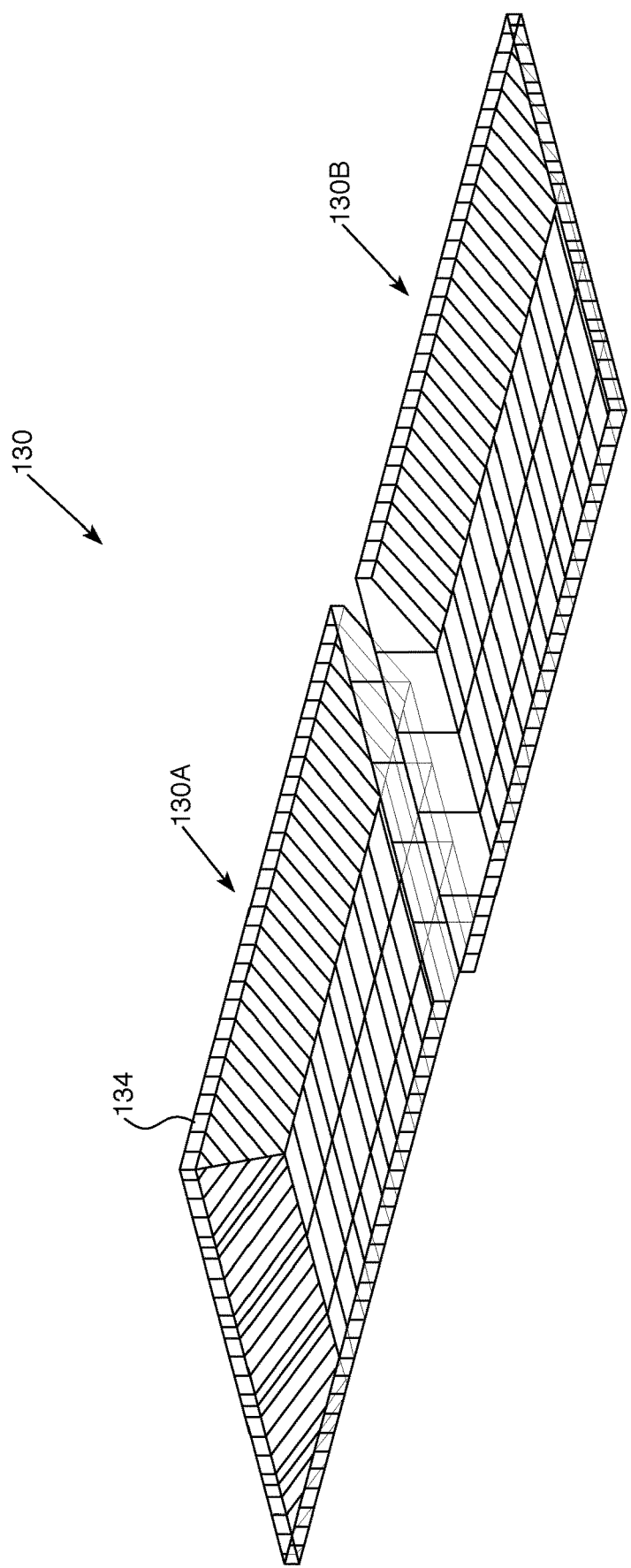
FIG. 6 is a perspective view of the netting system of FIG. 3 removed from the air-cooled condenser for clarity.
Figure 7:
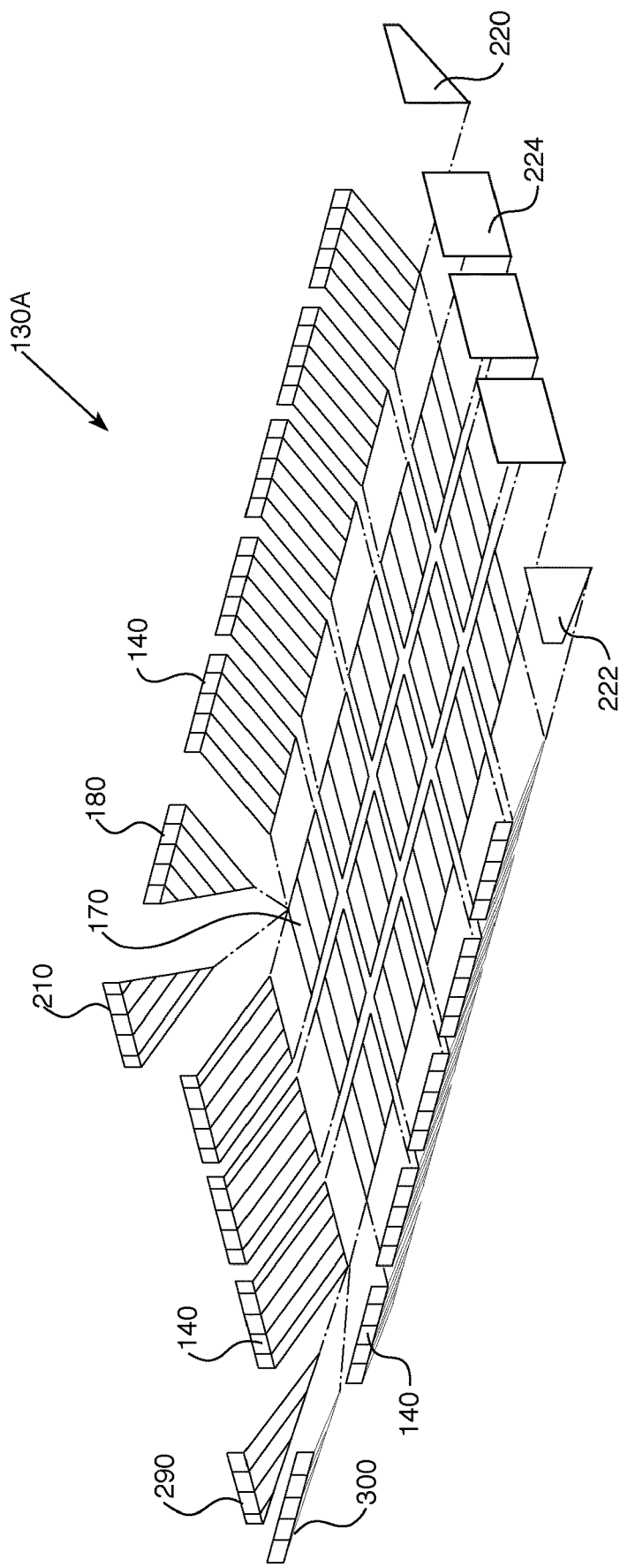
FIG. 7 is an exploded perspective view a portion of the netting system of FIG. 3 removed from the air-cooled condenser for clarity.

A system 130 in FIG. 6 for limiting access by flying animals to a plurality of selectively rotating fans of an air-cooled condenser comprises a plurality of netting segments, specifically a plurality of perimeter netting segments 140 and a plurality of interior netting segments 170 arranged and positioned as described in detail below (and typically also other types of netting segments as described below). The netting system 130 is mounted to the framework 106 to surround the fans 112 on four sides and below such that flying animals cannot reach the underside (i.e., intake side) of the fans 112. The top edge 134 of the netting system 130 is attached at the level at which the fans 112 are attached to the framework 106 (which may be termed the fan deck 132). As seen in FIG. 6, the netting system 130 may comprise a separate netting sub-assembly for each sub-unit of the ACC. FIG. 6 shows a first netting sub-assembly 130A that is affixed to sub-unit 122A and a second netting sub-assembly 130B that is affixed to sub-unit 122B. FIG. 7 illustrates the individual netting segments that make up the first netting sub-assembly 130A (second netting sub-assembly 130B would typically be constructed of the same type and arrangement of netting segments, but in a mirror image arrangement).

The netting segments may be any suitable size, style, or construction of netting, including any suitable material. In one exemplary embodiment, the netting segments are constructed of UV protected polyethylene twisted knotted twine, with a weight range of 0.22-0.23 ounces per square foot and an opening size of ⅜ inch by ⅜ inch (providing about an 89% opening).

Each perimeter netting segment 140 is positioned at least partly below a corresponding one of the perimeter fans 116. Importantly, at least a portion of each perimeter netting segment 140 is angled inward and downward toward a corresponding interior netting segment 170, as seen in FIG. 6. This angling of the perimeter netting segments 140 provides two important benefits. First, the angling increases the surface area of the perimeter netting segment 140 that is "seen" (via echolocation) by a bat that is flying level toward the perimeter netting segment 140. This increases the likelihood that a bat will recognize that there is an obstruction in its path and will alter its flight path accordingly, thereby avoiding flying into the perimeter netting segment 140. Second, the angling reduces the likelihood of ice sheets forming on the perimeter netting segments 140. Such ice sheets can fall onto and injure personnel below. Such ice sheets can also block air flow to the perimeter fans reducing their efficiency, thus affecting thermal performance of the ACC.

Figures 8, 8A:
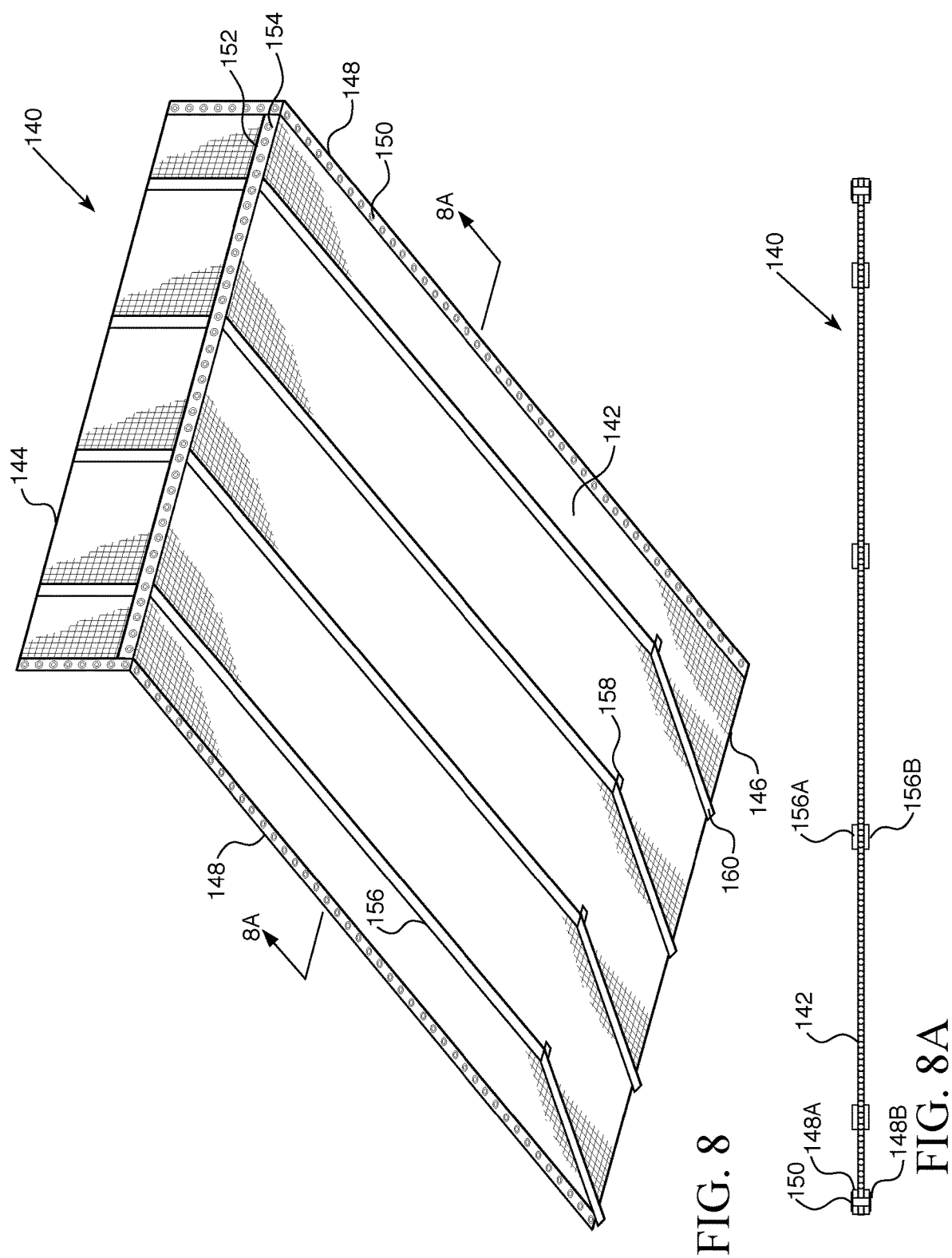
FIG. 8 is a perspective view of a perimeter netting segment of the netting system of FIG. 6.
FIG. 8A is a sectional view of the perimeter netting segment of FIG. 8.

As seen in FIGS. 8 and 8A, each perimeter netting segment 140 is constructed of a large rectangular sheet of netting material 142 having a first edge 144 that is affixed to the framework 106 and a second edge 146 that is affixed to a corresponding interior netting segment 170. In one exemplary embodiment of the invention, each perimeter netting segment is 52 feet wide and 65 feet long. Each side edge (i.e., the edges perpendicular to the first and second edges 144, 146) is strengthened with a flexible strap 148 having a plurality of grommets 150 spaced along its length. Each side edge strap 148 comprises two layers 148A, 148B sandwiching the side edge and sewn together. In one exemplary embodiment of the invention, each layer 148A, 148B comprises nylon seat belt webbing material having a two inch width, a thickness range of 0.055-0.075 inches, a breaking strength of 5,500 pounds, and certified to military specification Mil-W-4088, Type 24. In one exemplary embodiment of the invention, the grommets are constructed of stainless steel, have an outer diameter of 25 millimeters (mm), an inner diameter of 12 mm, a thickness of 5 mm thick, and are spaced 12 inches apart.

Each perimeter netting segment 140 further comprises a header strap 152 with grommets 154 for use in affixing the perimeter netting segment 140 to the framework 106 as described below. The header strap 152 is constructed the same as the edge straps 148. Each perimeter netting segment 140 further comprises a plurality of reinforcing straps 156 (four are shown, but more or fewer may be used) that strengthen the perimeter netting segment 140 to help prevent, e.g., wind damage. The reinforcing straps 156 are constructed similarly as the edge straps 148 (but without grommets), using two layers 156A, 156B of nylon webbing sewn together. For most of the length of the perimeter netting segment 140, the two layers of the reinforcing straps 156 sandwich the netting. However, near the second edge 146 the construction of the reinforcing straps 156 differs. A slit 158 is defined in the netting 142 at the same distance (eight feet in one exemplary embodiment) from the second edge 146 for all of the reinforcing straps. The bottom layer is fed through the slit 158 such that the two layers are sewn together without the netting 142 therebetween, thereby forming free ends 160 that are not attached to the netting 142. The free ends 160 are used to attach the perimeter netting segment 140 as described below.

Each interior netting segment 170 is positioned at least partly below a corresponding one of the interior fans 118. Each interior netting segment is typically positioned substantially parallel to its corresponding interior fan. That is, each interior netting segment is typically substantially horizontal. Substantially parallel or horizontal means that a small deviation from parallel/horizontal is acceptable, as long as the interior netting segment can be attached to other adjacent interior netting segments. Since the mounting position of each interior netting segment 170 is at least partly determined by the location of substantially horizontal structural elements of the framework 106, any deviation from parallel/horizontal will typically be a result of such a deviation in the position of the substantially horizontal structural elements of the framework 106 and will typically be minimal.

Figure 9:
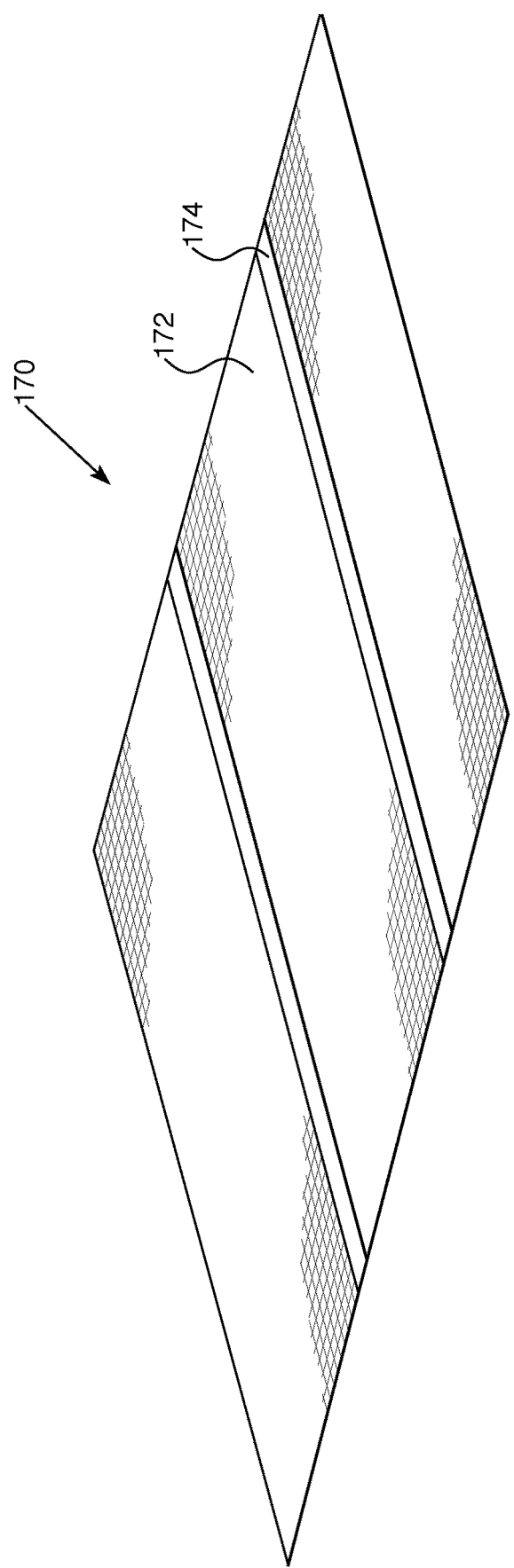
FIG. 9 is a perspective view of an interior netting segment of the netting system of FIG. 6.

As seen in FIG. 9, each interior netting segment 170 is constructed of a large square or rectangular sheet of netting material 172. In one exemplary embodiment of the invention, each interior netting segment is 51 feet wide and 50 feet long. Each interior netting segment 170 further comprises a plurality of reinforcing straps 174 (two are shown, but more may be used) that strengthen the interior netting segment 170 to help prevent, e.g., wind damage. The reinforcing straps 174 are constructed similarly as the reinforcing straps 156 of FIG. 8 using two layers of nylon webbing sewn together and sandwiching the netting 172, but without a free end.

Importantly, each interior netting segment 170 is positioned such that it is spaced apart from its corresponding interior fan at a distance selected such that the intake air at a level of the interior netting segment 170 has a speed slow enough such that one or more predetermined species of flying animal (e.g., bats) that is flying below the interior netting segment 170 will not be drawn into the interior netting segment. It may be desirable that the intake air speed at a level of the interior netting segment 170 is at or below a percentage of the maximum speed of one or more predetermined species of flying animal. For example, each interior netting segment may be spaced apart from its corresponding interior fan at a distance selected such that the intake air at a level of the interior netting segment has a speed less than twenty percent of a maximum speed of a predetermined species of flying animal. It is desirable to mount the interior netting segments where the framework 106 already has horizontal beams in place to which to mount the interior netting segments, thereby limiting the need to add additional mounting structure to the framework. Thus, the preferred mounting location and distance from the fans of the interior netting segments is typically the closest horizontal beams that are at least the minimum distance from the fans that provides the acceptable intake air speed at the interior netting segments. In other words, the interior netting segments may be further away from the fans than is strictly necessary if only the intake air speed is considered. However, it is not desirable to locate the interior netting segments even further away from the fans than the closest horizontal beams, as the further away the interior netting segments are from the fans the greater the amount of netting material is needed to create the netting system. In one exemplary embodiment of the invention, each interior netting segment 170 is mounted 24 feet below its corresponding fan, at which level the air intake speed is about seven miles per hour (mph). One or more of the common bat species in Virginia is capable of flying at about 40 mph.

Figure 10:
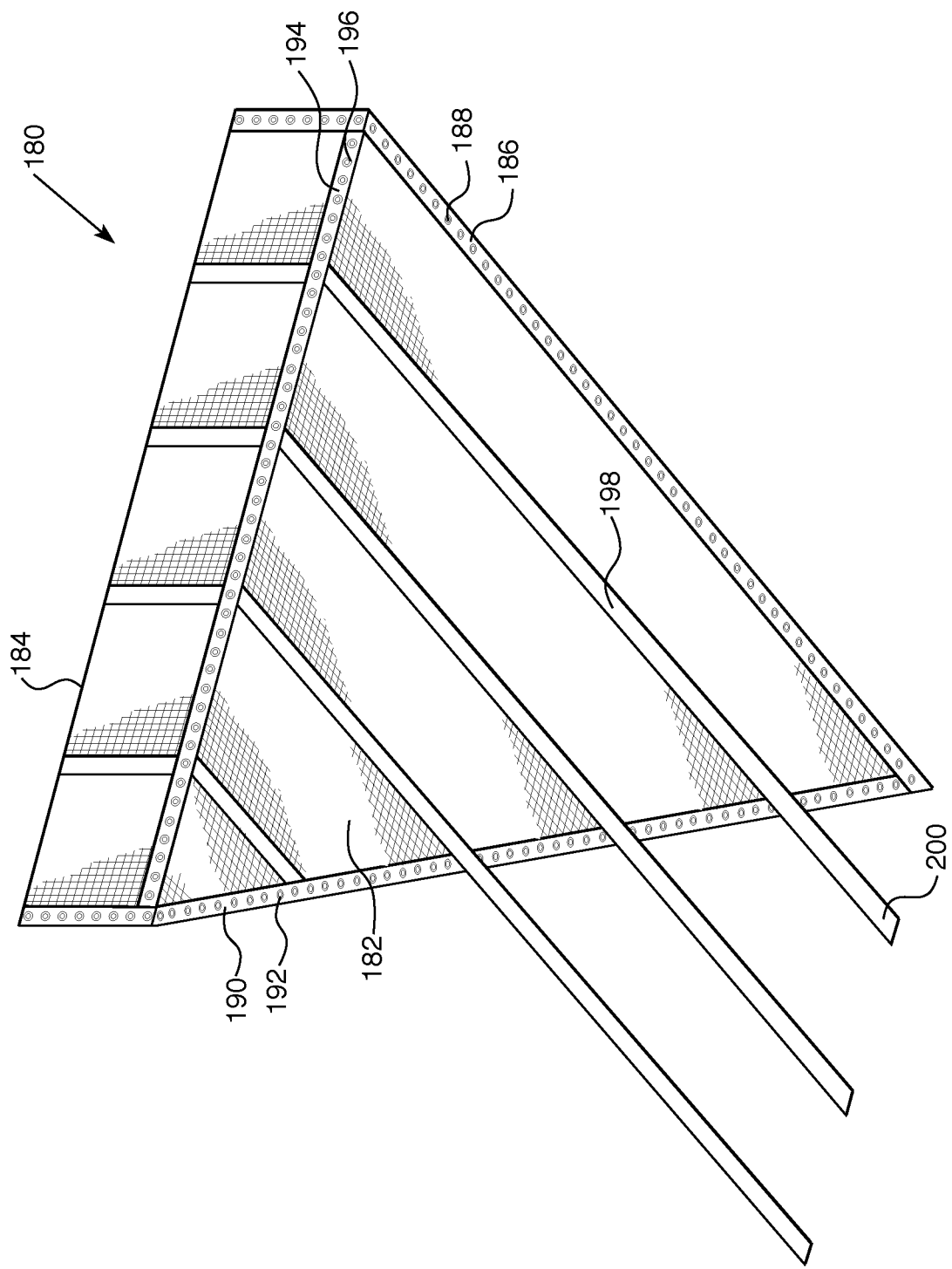
FIG. 10 is a perspective view of a corner netting segment of the netting system of FIG. 6.

The netting system 130 comprises netting segments that form the angled corners. The angled corners are positioned at least partly below a corresponding corner perimeter fan (i.e., a perimeter fan that is located at one of the two corners where perimeter edges meet). Each angled corner may be formed using a single corner netting segment or, preferably and as illustrated, a pair of corner netting segments. As seen in FIG. 7, one of the angled corners is formed by a first corner netting segment 180 and a second corner netting segment 210 and the other of the angled corners is formed by a first corner netting segment 290 and a second corner netting segment 300. All of the corner netting segments have a similar structure, and therefore only the first corner netting segment 180 is described in detail (the second corner netting segment 300 is a mirror image of the first corner netting segment 180 and the first corner netting segment 290 is a mirror image of the second corner netting segment 210). As seen in FIG. 10, the first corner netting segment 180 is constructed of a large roughly triangular sheet of netting material 182 having a first edge 184 that is affixed to the framework 106, a second edge affixed to a corresponding perimeter netting segment, and a third edge affixed to the second corner netting segment 210. In one exemplary embodiment of the invention, each corner netting segment is 51 feet wide and 66 feet long. The second edge is strengthened with a flexible strap 186 having a plurality of grommets 188 spaced along its length. The third edge is also strengthened with a flexible strap 190 having a plurality of grommets 192 spaced along its length. The edge straps 186, 190 are constructed similarly as the edge straps 148 of the perimeter netting segment 140.

Each first corner netting segment 180 further comprises a header strap 194 with grommets 196 for use in affixing the first corner netting segment 180 to the framework 106 as described below. The header strap 194 is constructed the same as the header strap 152 of the perimeter netting segment 140. Each corner netting segment 180 further comprises a plurality of reinforcing straps 198 (four are shown, but more or fewer may be used) that strengthen the corner netting segment 180 to help prevent, e.g., wind damage. The reinforcing straps 198 are constructed similarly as the reinforcing straps 174 of the interior netting segment 170, but one or more (three as shown) of the reinforcing straps 198 run past the third edge to form free ends 200 that are used to attach the corner netting segment 180 to the framework 106 (typically via ratchets that are attached to the framework).

The plurality of netting segments may further comprise one or more vertical netting segments 224 and vertical corner netting segments 220, 222. The vertical netting segments 224 and vertical corner netting segments 220, 222 together form a vertical wall of netting adjacent the steam header space 104. This wall of netting need not be angled due to the presence of the steam header. Each vertical netting segment 224 is constructed of a large square or rectangular sheet of netting material as described above. In one exemplary embodiment of the invention, each vertical netting segment 224 is 51 feet wide and 37 feet high. Each vertical corner netting segment 220, 222 is constructed of a trapezoidal sheet of netting material as described above. Edge straps or reinforcing straps are typically not needed for the vertical netting segments 224, but the vertical corner netting segments 220, 222 may have straps (not illustrated) on the diagonal edge to connect to the adjacent perimeter netting.

As is apparent from FIGS. 6 and 7, each netting segment is attached to the framework 106 and to two or more other netting segments to form a continuous netting sub-assembly 130A, 130B that helps prevent flying animals from reaching the fans. The netting segments may be attached to each other by directly attaching adjacent edges, or by attaching adjacent edges to the framework in such a way as to avoid any gaps or openings between adjacent edges. Each perimeter netting segment 140 is attached to one interior netting segment 170 and to one or two other perimeter netting segments 140. Some perimeter netting segments 140 are also attached to a corner netting segment 180 or 210 or to a vertical corner netting segment 220 or 222.

Each interior netting segment 170 is attached to at least two other interior netting segments 170. Some interior netting segments 170 are attached to three other interior netting segments 170, and some are attached to four other interior netting segments 170. Some interior netting segments 170 are also attached to a perimeter netting segment 140. Some interior netting segments 170 are also attached to a vertical netting segment 224.

Each vertical netting segment 224 is attached to an interior netting segment 170 and at least one other vertical netting segment 224. Some vertical netting segments 224 are attached to two other vertical netting segments 224. Some vertical netting segments 224 are attached to a vertical corner netting segments 220 or 222. Each vertical corner netting segment 220, 222 is attached to a perimeter netting segment 140 and to one vertical netting segment 224.

Figure 11:
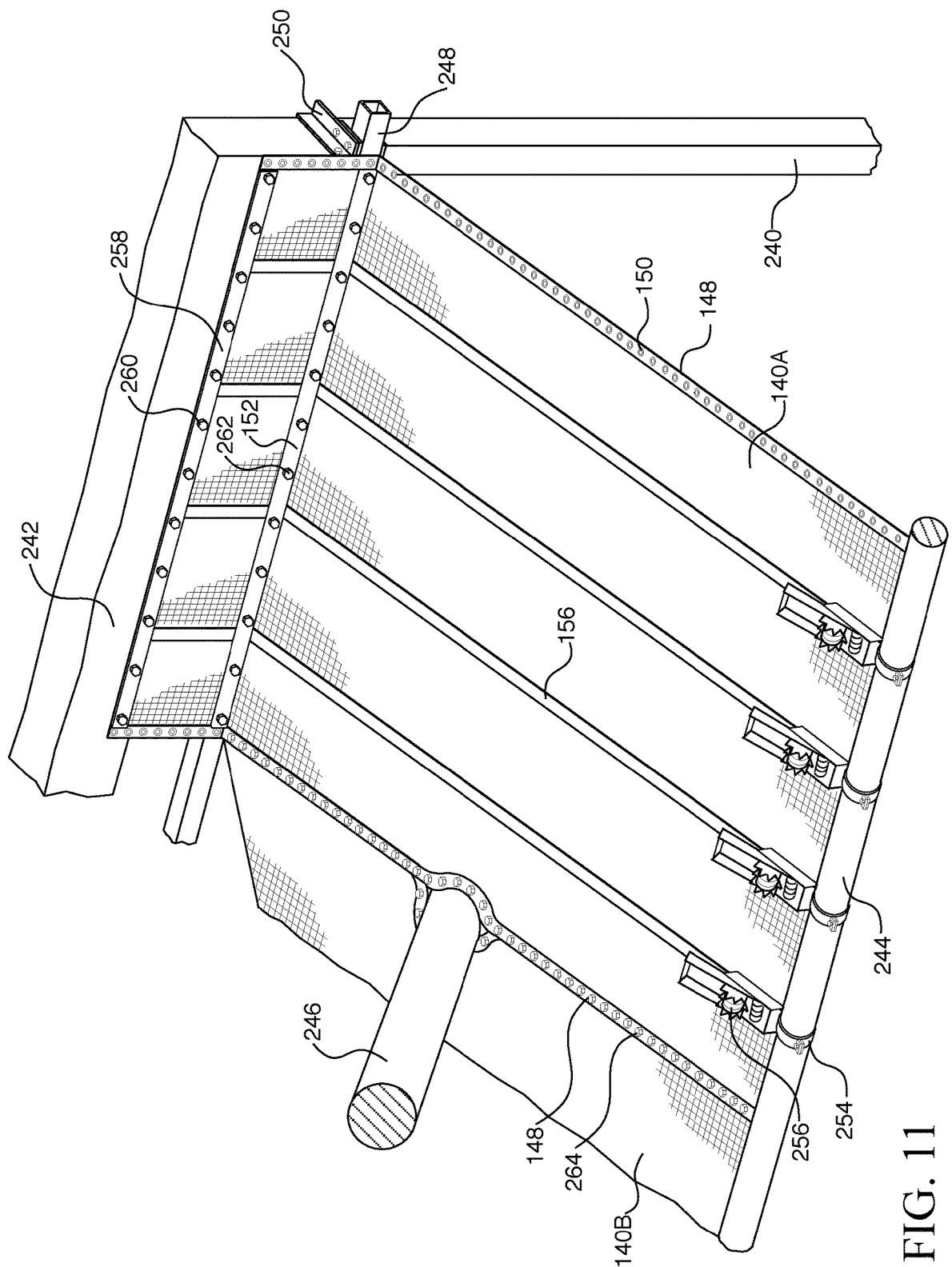
FIG. 11 is a perspective view illustrating the installation of perimeter netting segments of the netting system of FIG. 6.

FIG. 11 illustrates one way of affixing a perimeter netting segment to a framework. FIG. 11 shows two adjacent perimeter netting segments 140A, 140B (140B is partially shown; only the process for mounting perimeter netting segment 140A will be described for simplicity, as the mounting process is the same for both). The illustrated portion of the framework includes a vertical post 240 on the outer perimeter of the framework, a horizontal beam 242 on the outer perimeter of the framework, a horizontal beam 244 on the interior of the framework, and an angled beam 246 (for bracing) that would typically span from an outer perimeter vertical post (similar to 240) inward and upward to an interior horizontal beam. An additional horizontal beam 248 has been added (using mounting adapter 250 (only one is shown, but multiple mounting adapters would be used)) to the framework to provide an additional horizontal surface to which to mount the perimeter netting segments.

The first end of the perimeter netting segment 140A is secured to horizontal beam 242 using an elongated metal bar 258 called a termination bar. The first end is sandwiched between the horizontal beam 242 and the termination bar 258, and the termination bar 258 is affixed to the horizontal beam 242 using fasteners 260. The fasteners 260 may be, for example, screws or bolts that penetrate the horizontal beam 242 or may be nuts that affix to threaded posts that protrude from the horizontal beam 242. Header strap 152 is affixed to the added horizontal beam 248 using fasteners 262. The fasteners 262 may be, for example, screws or bolts that penetrate the horizontal beam 248 or may be nuts that affix to threaded posts that protrude from the horizontal beam 248. The section of the perimeter netting segment 140A between the termination bar 258 and the header strap 152 is substantially vertical. This relatively short (about ten feet in one exemplary embodiment) vertical section is provided to ensure that the rest of the perimeter netting segment 140A is below the bottom of its corresponding perimeter fan.

The other end of the perimeter netting segment 140A is affixed to the interior horizontal beam 244 two ways. The free ends 160 (not visible in FIG. 11) of the reinforcing straps 156 are affixed to ratchets 256 that are in turn affixed to the interior horizontal beam 244 via ring clamps 254 (or any other suitable mechanism or method). The ratchets 246 enable the reinforcing straps 156 to be set to the desired tension. Typically, it is desirable to have some amount of slack in the reinforcing straps 156 as the resulting ability to move reduces tensile load and eventually lowers tensile stress on the straps and also helps prevent wind damage to the perimeter netting segment 140A. In one exemplary embodiment of the invention, about 12 inches of slack is provided.

The second edge of the perimeter netting segment 140A (not visible in FIG. 11) is brought under the interior horizontal beam 244, any excess length of netting is folded or cut off, the second edge is sandwiched between a termination bar (not visible in FIG. 11) and the interior horizontal beam 244, and the termination bar is affixed to the interior horizontal beam 244 using any suitable fastener (not visible in FIG. 11). A corresponding interior netting segment 170 is also affixed to the interior horizontal beam 244 in the same manner, thereby affixing the second edge of the perimeter netting segment 140A to a corresponding edge of the corresponding interior netting segment 170.

The side edges of adjacent perimeter netting segments are affixed to each other by aligning the grommets 150 of each segments edge strap 148 and inserting a fastener 264 through the aligned grommets 150. The fastener 264 may be any suitable fastener, such as a bolt and nut.

Often, a structural element of the framework, such as angled beam 246, will be positioned where two adjacent perimeter netting segments meet as shown in FIG. 11. In such a situation, the adjacent edge straps 148 are not affixed to each other at that location but rather wrap around opposing sides of the structural element and are affixed to the structural elements using a fastener at the grommets that contact the structural element.

As mentioned above and seen in FIGS. 6 and 11, at least a portion of each perimeter netting segment 140 is angled inward and downward toward a corresponding interior netting segment 170. The specific angle is typically not important. Rather, the angle is based on the mounting location (i.e., height) of the interior netting segments and the distance that must be spanned by the angled portion of the perimeter netting segment from the outer perimeter of the fan matrix to the interior netting segments (e.g., from horizontal beam 248 to horizontal beam 244 in FIG. 11).

Corner netting segments 180, 210 are attached to the framework and to adjacent netting segments very similarly to how the perimeter netting segments are attached.

Figure 12:
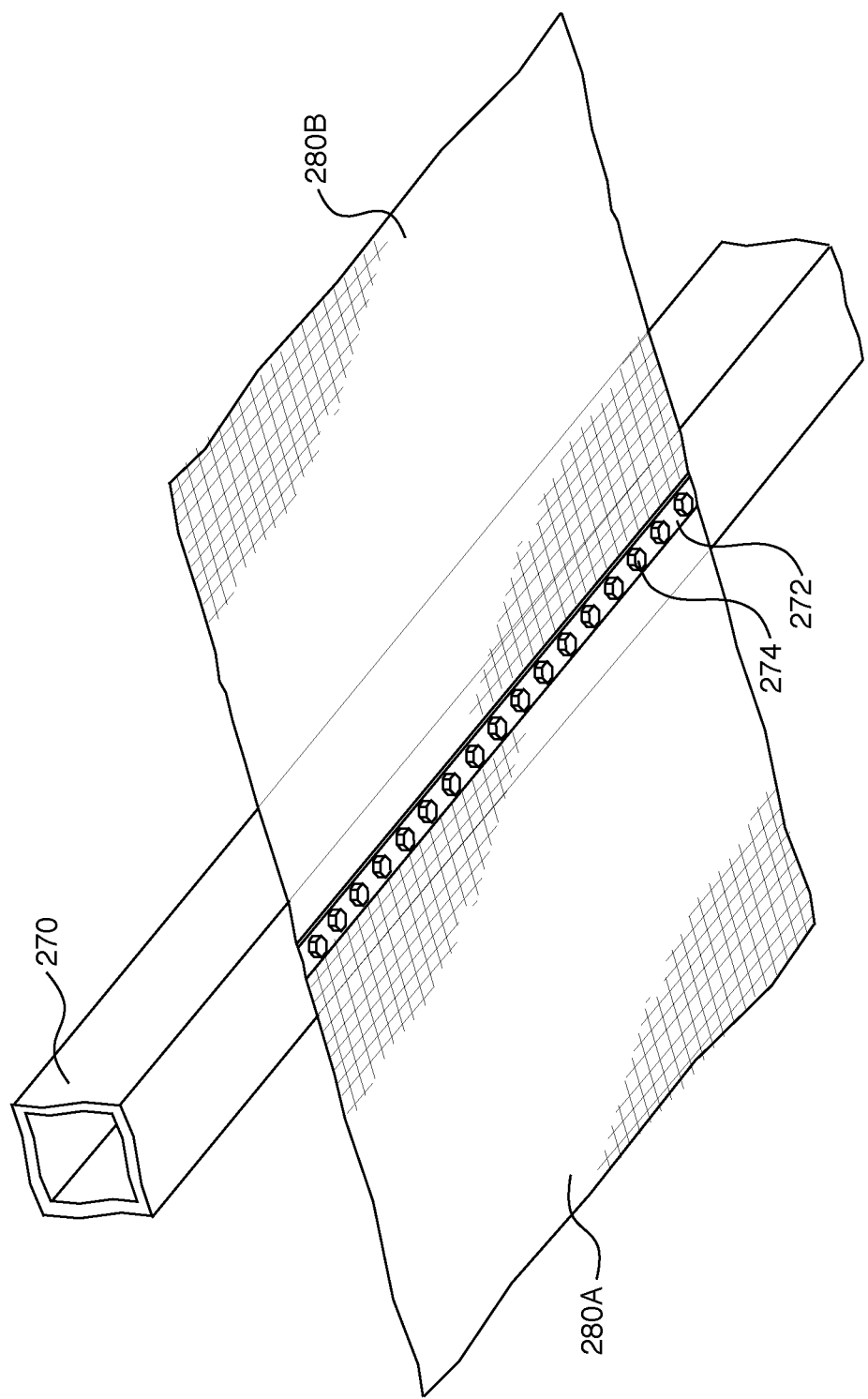
FIG. 12 is a perspective view illustrating the installation of adjacent netting segments of the netting system of FIG. 6.

FIG. 12 illustrates one mechanism and method for attaching adjacent netting segments 280A, 280B to a beam 270. FIG. 12 specifically illustrates attaching adjacent netting segments 280A, 280B to the underside of horizontal beam 270, but the same or a similar process may be used to attach adjacent netting segments to any side (top, bottom, side) of any type of beam (horizontal, vertical, angled). The mating edges of the adjacent netting segments 280A, 280B are brought together at the beam 270, any excess length of the netting segments may be folded or cut off, the mating edges are sandwiched between the horizontal beam 270 and a termination bar 272, and the termination bar 272 is affixed to the horizontal beam 270 using fasteners 274. The fasteners 274 may be, for example, screws or bolts that penetrate the horizontal beam 270 or may be nuts that affix to threaded posts that protrude from the horizontal beam 270.

FIG. 12 illustrates a mechanism and method for attaching two unspecified types of adjacent netting segments to a beam. The following specific types of adjacent netting segments could be attached to a beam as illustrated in FIG. 12: perimeter netting segment 140 to interior netting segment 170; interior netting segment 170 to interior netting segment 170; interior netting segment 170 to vertical netting segment 224; vertical netting segment 224 to vertical netting segment 224; vertical netting segment 224 to vertical corner netting segment 220; or vertical netting segment 224 to vertical corner netting segment 222.

FIG. 11 illustrates how the side edges of adjacent perimeter netting segments can be attached to each other via fasteners through the grommets of the edge straps. The side edges of the following adjacent netting segments may also be similarly attached: perimeter netting segment 140 to first corner netting segment 180; first corner netting segment 180 to second corner netting segment 210; second corner netting segment 210 to perimeter netting segment 140; perimeter netting segment 140 to vertical corner netting segment 222; or perimeter segment 140 to vertical corner netting segment 220.

Some or all of the edges of the vertical corner netting segment 220, vertical corner netting segment 222, or vertical netting segment 224 may be attached to structural elements of the framework using termination bars as described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A system for limiting access by flying animals to a plurality of selectively rotating fans of an air-cooled condenser, the fans mounted on a framework and arranged in a matrix, each fan being positioned at a same vertical position on the framework, each fan being positioned to selectively intake air from below the fan and eject air above the fan, each fan comprising either (i) a perimeter fan positioned along any one of three or four outer edges of the matrix or (ii) an interior fan, the system comprising:
   a plurality of netting segments comprising a plurality of perimeter netting segments and a plurality of interior netting segments;
   wherein each perimeter netting segment is adapted to be positioned at least partly below a corresponding one of the perimeter fans;
   wherein each interior netting segment is adapted to be positioned at least partly below a corresponding one of the interior fans;
   wherein each perimeter netting segment has a first edge adapted to be affixed to the framework and a second edge affixed to a corresponding interior netting segment of the plurality of interior netting segments; and
   wherein at least a portion of each perimeter netting segment is angled inward and downward toward its corresponding interior netting segment.

2. The system of claim 1, wherein each interior netting segment is adapted to be positioned substantially parallel to its corresponding interior fan.

3. The system of claim 1, wherein the plurality of netting segments further comprises two or more corner netting segment pairs, each corner netting segment pair adapted to be positioned at least partly below a corresponding corner perimeter fan, each corner netting segment pair comprising adjacent first and second corner netting segments, each of the first and second corner netting segments having a first edge adapted to be affixed to the framework, a second edge affixed to a corresponding perimeter netting segment of the plurality of perimeter netting segments, and a third edge affixed to the other corner netting segment.

4. The system of claim 1, wherein the plurality of netting segments further comprises two or more corner netting segments, each corner netting segment adapted to be positioned at least partly below a corresponding corner perimeter fan, each corner netting segment having a first edge adapted to be affixed to the framework, a second edge affixed to a first corresponding perimeter netting segment of the plurality of perimeter netting segments, and a third edge affixed to a second corresponding perimeter netting segment of the plurality of perimeter netting segments.

5. The system of claim 1, wherein the plurality of netting segments further comprises one or more vertical netting segments, each vertical netting segment having a first edge adapted to be affixed to the framework and a second edge affixed to a corresponding interior netting segment of the plurality of interior netting segments.

6. The system of claim 5, wherein the plurality of netting segments further comprises one or more vertical corner netting segments, each vertical corner netting segment having a first edge adapted to be affixed to the framework, a second edge affixed to a corresponding vertical netting segment of the one or more vertical segments, and a third edge affixed to a corresponding perimeter netting segment of the plurality of perimeter netting segments.

7. The system of claim 1, wherein each interior netting segment is adapted to be spaced apart from its corresponding interior fan at a distance selected such that the intake air at a level of the interior netting segment has a speed slow enough such that a predetermined species of flying animal that is flying below the interior netting segment will not be drawn into the interior netting segment.

8. The system of claim 1, wherein each interior netting segment is adapted to be spaced apart from its corresponding interior fan at a distance selected such that the intake air at a level of the interior netting segment has a speed less than twenty percent of a maximum speed of a predetermined species of flying animal.

9. The system of claim 1, wherein one or more of the perimeter netting segments comprise a plurality of pairs of flexible straps; and
   wherein at least corresponding first sections of each pair of straps sandwich a portion of the respective perimeter netting segment and are affixed to each other.

10. The system of claim 9, wherein corresponding second sections of one or more of the pairs of flexible straps are affixed to each other without sandwiching a portion of the respective perimeter netting segment; and
   wherein the second sections of one or more of the pairs of flexible straps of one or more of the perimeter netting segments are adapted to be affixed to a portion of the framework.

11. The system of claim 1, wherein one or more of the interior netting segments comprise a plurality of pairs of flexible straps that sandwich a portion of the respective interior netting segment and are affixed to each other.

12. The system of claim 1, wherein the second edge of each perimeter netting segment is affixed to the corresponding interior netting segment via an elongated bar sandwiching portions of the perimeter netting segment and the corresponding interior netting segment against a portion of the framework.

13. The system of claim 1, wherein each interior netting segment comprises at least one edge that is affixed to a corresponding edge of an adjacent interior netting segment of the plurality of interior netting segments; and
wherein the at least one edge of each interior netting segment is affixed to the corresponding edge of the adjacent interior netting segment via an elongated bar sandwiching corresponding portions of the adjacent interior netting segments against a portion of the framework.

14. A method for limiting access by flying animals to a plurality of selectively rotating fans of an air-cooled condenser, the fans mounted on a framework and arranged in a matrix, each fan being positioned at a same vertical position on the framework, each fan positioned to selectively intake air from below the fan and eject air above the fan, each fan comprising either (i) a perimeter fan positioned along any one of three or four outer edges of the matrix or (ii) an interior fan, the method comprising:
positioning each of a plurality of perimeter netting segments at least partly below a corresponding one of the perimeter fans, each perimeter netting segment having a first edge and a second edge;
positioning each of a plurality of interior netting segments at least partly below a corresponding one of the interior fans;
affixing the first edge of each perimeter netting segment to the framework; and
affixing the second edge of each perimeter netting segment to a corresponding interior netting segment of the plurality of interior netting segments;
wherein at least a portion of each perimeter netting segment is angled inward and downward toward its corresponding interior netting segment.

15. The method of claim 14, wherein each interior netting segment is positioned substantially parallel to its corresponding interior fan.

16. The method of claim 14, further comprising:
positioning each of two or more corner netting segment pairs at least partly below a corresponding corner perimeter fan, each corner netting segment pair comprising adjacent first and second corner netting segments, each of the first and second corner netting segments having a first edge, a second edge, and a third edge;
affixing the first edge of each of the first and second corner netting segments to the framework;
affixing the second edge of each of the first and second corner netting segments to a corresponding perimeter netting segment of the plurality of perimeter netting segments; and
affixing the third edge of each of the first and second corner netting segments to the other corner netting segment.

17. The method of claim 14, further comprising:
positioning each of two or more corner netting segments at least partly below a corresponding corner perimeter fan, each corner netting segment having a first edge, a second edge, and a third edge;
affixing the first edge of each corner netting segment to the framework;
affixing the second edge of each corner netting segment to a first corresponding perimeter netting segment of the plurality of perimeter netting segments; and
affixing the third edge of each corner netting segment to a second corresponding perimeter netting segment of the plurality of perimeter netting segments.

18. The method of claim 14, further comprising:
affixing a first edge of each of one or more vertical netting segments to the framework; and
affixing a second edge of each of the one or more vertical netting segments to a corresponding interior netting segment of the plurality of interior netting segments.

19. The method of claim 18, further comprising:
affixing a first edge of each of one or more vertical corner netting segments to the framework;
affixing a second edge of each of the one or more vertical corner netting segments to a corresponding vertical netting segment of the one or more vertical netting segments; and
affixing a third edge of each of one or more vertical corner netting segments to a corresponding perimeter netting segment of the plurality of perimeter netting segments.

20. The method of claim 14, wherein each interior netting segment is spaced apart from its corresponding interior fan at a distance selected such that the intake air at a level of the interior netting segment has a speed slow enough such that a predetermined species of flying animal that is flying below the interior netting segment will not be drawn into the interior netting segment.

21. The method of claim 14, wherein each interior netting segment is spaced apart from its corresponding interior fan at a distance selected such that the intake air at a level of the interior netting segment has a speed less than twenty percent of a maximum speed of a predetermined species of flying animal.

22. The method of claim 14, wherein one or more of the perimeter netting segments comprise a plurality of pairs of flexible straps; and
wherein at least corresponding first sections of each pair of straps sandwich a portion of the respective perimeter netting segment and are affixed to each other.

23. The method of claim 22, wherein corresponding second sections of one or more of the pairs of flexible straps are affixed to each other without sandwiching a portion of the respective perimeter netting segment; and
wherein the method further comprises affixing the second sections of one or more of the pairs of flexible straps of one or more of the perimeter netting segments to a portion of the framework.

24. The method of claim 14, wherein one or more of the interior netting segments comprise a plurality of pairs of flexible strap that sandwich a portion of the respective interior netting segment and are affixed to each other.

25. The method of claim 14, wherein the second edge of each perimeter netting segment is affixed to the corresponding interior netting segment via an elongated bar sandwiching portions of the perimeter netting segment and the corresponding interior netting segment against a portion of the framework.

26. The method of claim 14, further comprising affixing at least one edge of each interior netting segment to a corresponding edge of an adjacent interior netting segment of the plurality of interior netting segments;
wherein the at least one edge of each interior netting segment is affixed to the corresponding edge of the adjacent interior netting segment via an elongated bar sandwiching corresponding portions of the adjacent interior netting segments against a portion of the framework.

\* \* \* \* \*